(12) United States Patent
Olszak

(10) Patent No.: US 10,473,451 B2
(45) Date of Patent: Nov. 12, 2019

(54) MEASURING THE POSITION OF OBJECTS IN SPACE

(71) Applicant: APRE INSTRUMENTS, INC., Tucson, AZ (US)

(72) Inventor: Artur Olszak, Tucson, AZ (US)

(73) Assignee: APRE INSTRUMENTS, INC., Tucson, AZ (US)

( * ) Notice: Subject to any disclaimer, the term of this patent is extended or adjusted under 35 U.S.C. 154(b) by 0 days.

(21) Appl. No.: 16/055,125

(22) Filed: Aug. 5, 2018

(65) Prior Publication Data

US 2019/0041186 A1    Feb. 7, 2019

Related U.S. Application Data

(60) Provisional application No. 62/541,906, filed on Aug. 7, 2017.

(51) Int. Cl.
*G01B 9/02*    (2006.01)
*G01J 9/02*    (2006.01)

(52) U.S. Cl.
CPC ....... *G01B 9/02017* (2013.01); *G01B 9/0207* (2013.01); *G01J 9/02* (2013.01)

(58) Field of Classification Search
CPC .. G01B 9/02; G01B 9/02017; G01B 9/02019; G01B 9/02034; G01B 9/02038; G01B 9/02039; G01B 9/0207; G01B 9/02067; G01B 11/005; G01B 11/007; G01B 5/008; G01B 5/012; G01B 7/008; G01C 3/08; G01J 9/02; G01S 17/66; G01S 17/88

USPC ........................................................ 356/450
See application file for complete search history.

(56) References Cited

U.S. PATENT DOCUMENTS

| 4,304,464 A * | 12/1981 | Hill | G01J 9/02 356/520 |
| 2002/0179866 A1* | 12/2002 | Hoeller | G01B 11/005 250/559.33 |
| 2015/0085297 A1* | 3/2015 | Hughes | G01S 17/42 356/482 |

* cited by examiner

*Primary Examiner* — Tarifur R Chowdhury
*Assistant Examiner* — Jonathon Cook
(74) *Attorney, Agent, or Firm* — Antonio R. Durando

(57) ABSTRACT

Interference fringes in a bullseye pattern are produced by a measurement module by interfering a flat reference beam with a spherical beam reflected by a sphere connected to the tip of a probe in point contact with a test object. The bullseye interferogram is registered at a detector and analyzed conventionally to produce a position measurement of the tip of the probe. A beam correction module is used to align the bullseye interferogram with the illumination axis of the measurement module. By combining at least three such measurement modules in a coordinate measurement machine, the three-dimensional position of the probe and of its point contact with the test object can be obtained from analysis of the bullseye interferograms registered by the detectors with high precision and greatly reduced Abbe error.

17 Claims, 9 Drawing Sheets

MEASURING THE POSITION OF OBJECTS IN SPACE

RELATED APPLICATIONS

This application is based on and claims the priority of U.S. Provisional Application No. 62/541,906, filed Aug. 7, 2017, hereby incorporated by reference.

BACKGROUND OF THE INVENTION

Field of the Invention

This invention relates in general to the measurement of the position of objects in space, such as in the field of optical coordinate measuring machines, and, in particular, to a novel approach based on tracking directly the point of contact of the measurement probe.

Description of the Prior Art

The measurement of an object's position in space is a cornerstone of modern technology and coordinate measurement machines (CMMs) are one of the most common devices used for quality control of a wide variety of objects, from mechanical parts to optical surfaces. CMMs typically consist of a sensor (the probe) used to detect by contact the presence of the measured surface and a metrology frame that provides the space coordinates of the contact point. A typical CMM is shown schematically in FIG. 1, illustrating a conventional probe 10 with a single-point-contact sensing tip 12 used to measure an object O. A metrology frame 14 is used to track the position of the probe tip 12 as it is moved to measure the surface of the object O. In operation the machine reads the input from the probe as it traces the part at various points and the X,Y,Z coordinates of these points are used to determine size and shape of the measured object with micrometer precision.

There are many different probe designs based on optical, mechanical, electrical, and other principles and their sensitivity and accuracy characteristics vary, but the underlying measurement principle is always the same: the position of the point of contact with the object is measured in space using at least three independent positional axes. The most common design uses the Cartesian coordinate system with X, Y, Z axes equipped with distance measuring devices. One of the common devices used in high-precision measurements is the distance measuring interferometer (DMI), which uses the interference of laser light to precisely measure displacements along straight lines.

Many non-contact probes are optics-based. They typically provide good sensitivity but are limited by the amount of light reflected by the tested surface, thus requiring proper positioning relative to the surface to achieve optimal sensing conditions. In practice this means that a limited range of surface slopes can be reliably detected, which requires the repeated reorienting of the probe to place it substantially perpendicular to the tested surface, a task that makes the measurement systems less accurate and more complex. Furthermore, the ability to reorient the probe through rotation requires calibration of additional critical parameters in the operation of a coordinate measurement machine, with attendant uncertainties and potential errors. Therefore, contact probes are simpler to operate and generally preferred.

CMMs equipped with contact probes and a DMI are examples of high-accuracy metrology-frame implementation, but even DMIs are subject to the so-called Abbe angular error (also known as sine error); i.e., the error of positional measurements resulting from the actual contact point being separated by some distance from the point where the linear coordinates are measured. In an ideal measurement machine the probe 10 is always perpendicular to the plane of motion of the driving axes. However, as illustrated in magnified manner in FIG. 2 with respect to a single linear direction, in actual systems, because of mechanical inaccuracies in the stages, the probe 10 tends to tilt in relation to the tip 12 as it is moved between successive positions, such as in the direction illustrated by arrow 16. As a result, the distance D' measured at the base of the probe 10 along the line of motion of the translating mechanism (that is, the distance reported by DMI) is different from the actual displacement D of the probe tip 12. This is a purely geometric distortion error that is hard to avoid in real-world CMM probe designs. Various schemes have been implemented in the art to reduce the influence of this error, but they invariably complicate the design and increase the cost of the CMM, and do not fully achieve their goal.

An ideal solution would be to measure the position of the actual probe tip 12, rather than tracking the position of the point of connection of the probe 10 to the translating mechanism along the axis of translation. However, this is difficult to do with a high degree of accuracy because DMI devices only work along a single line of sight. It would be also ideal to track the tip directly because it would enable measuring contact point positions in three-dimensional space anywhere along the surface of the measured object, which is not possible with current probes wherein the alignment of the probe with the translating mechanism cannot be changed while maintaining the integrity of the DMI measurement. This disclosure describes a method of tracking the position of a reflective surface in 3-D space placed at or near the point of contact using interferometric principles that both provide high accuracy and remove or greatly reduce the influence of Abbe error on the measurement process.

SUMMARY OF THE INVENTION

The invention resides in the idea of producing interference fringes in a bullseye pattern by interfering a flat reference beam with a spherical beam reflected by a curved test surface. Such bullseye pattern amounts to interferometric fringes from which the precise location of the test surface (its coordinate with respect to a reference system) can be established by conventional interferometric analysis. Accordingly, in the most general sense, the interferometric system for measuring the position of an object in space according to the invention includes an interferometric measurement module configured to emit a test wavefront shaped as a diverging cone of light directed toward a curved reflective test surface attached to a probe in point contact with the object. The bullseye interferogram produced by interfering the returning test beam with the reference beam is registered at a detector and analyzed conventionally to produce a position measurement of the reflective test surface.

A beam correction module is preferably used to align the bullseye interferogram with the illumination axis of the measurement module to facilitate the analysis of the fringes. An exemplary correction model includes a sensor with multiple detector elements receiving signals from the bullseye interferogram, and a processor programmed to drive the correction module to change the axial position of the bullseye interferogram such that the detector elements detect a perfect bullseye pattern when the interferogram is centered on the axis of illumination. The multiple detector elements are preferably configured as four satellite detectors disposed symmetrically around a center detector. The reflective surface is preferably spherical and attached to the probe very near the point of contact with the test object or, best, it constitutes the tip of the probe itself.

In a coordinate measurement machine embodiment, the invention includes at least three interferometric measurement modules configured to emit respective test wavefronts shaped as diverging cones of light directed toward the curved reflective surface attached to the probe of the CMM. Accordingly, respective bullseye interferograms are produced and sensed by respective detectors, and a three-dimensional position measurement of the reflective surface and the connected probe can be obtained from analysis of the bullseye interferograms registered by the multiple detectors. By providing conventional CMM three-dimensional motion of the probe in point contact with the measured object, the object can be scanned and measured with high precision and greatly reduced Abbe error.

Various other advantages will become clear from the description of the invention in the specification that follows and from the novel features particularly pointed out in the appended claims. Therefore, this invention includes the features hereinafter illustrated in the drawings, fully described in the detailed description of the preferred embodiments and particularly pointed out in the claims, but such drawings and description disclose only some of the various ways in which the invention may be practiced.

DETAILED DESCRIPTION OF THE INVENTION

Figure 1:
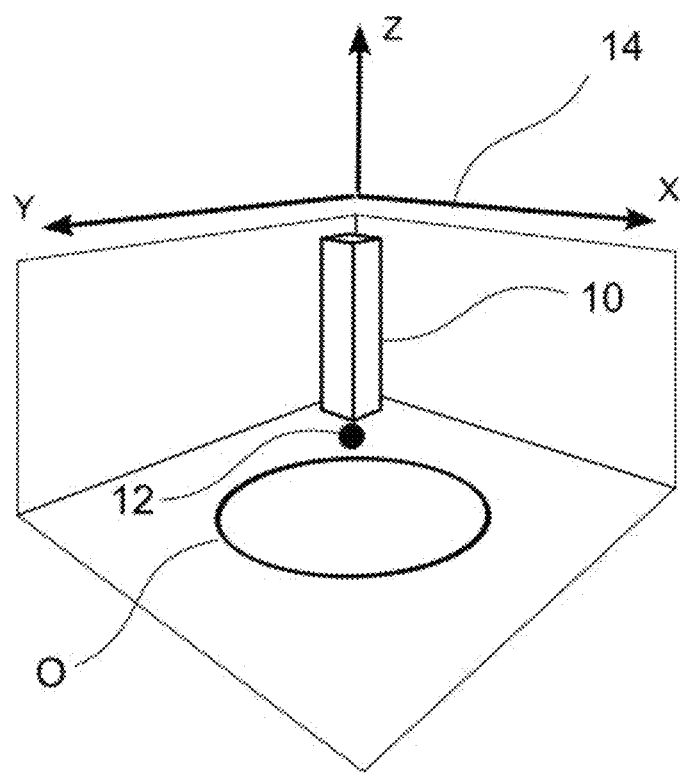
FIG. 1 is a basic schematic illustration of the main components of a conventional coordinate measurement machine.
Figure 2:
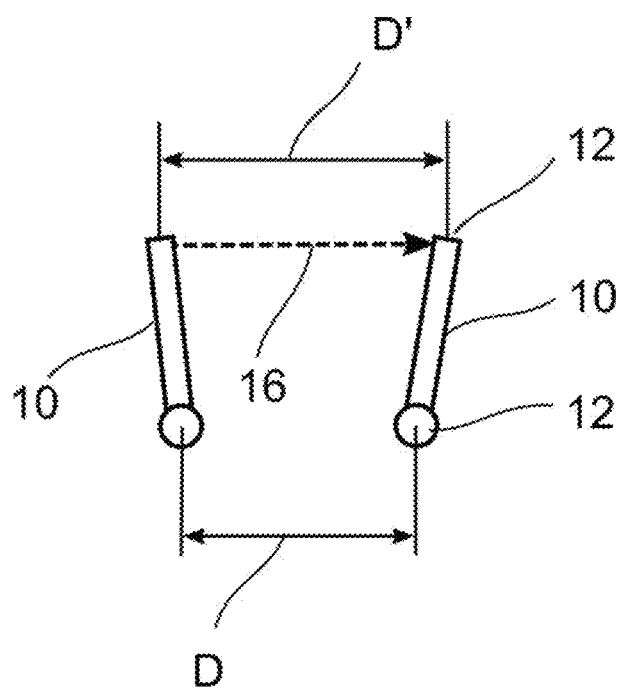
FIG. 2 is a schematic illustration of the Abbe error in conventional CMMs.
Figure 3:
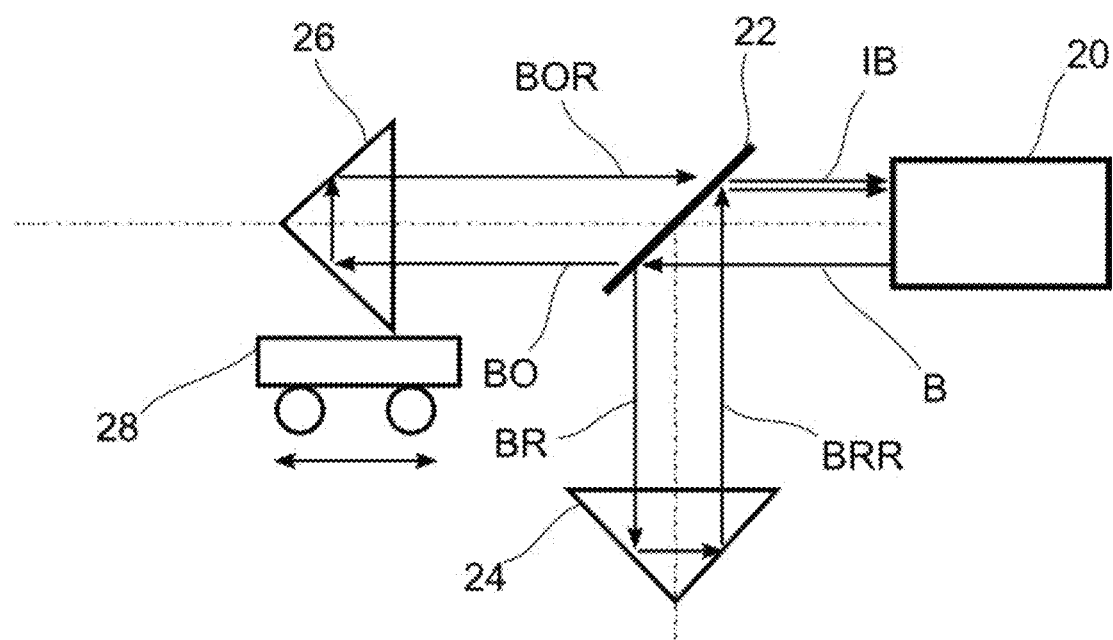
FIG. 3 is a schematic illustration of a typical DMI setup.

High-precision tracking methods typically employ light interference because of its high sensitivity and because measurement uncertainty is directly related to the wavelength used, which can be generated with high accuracy. A typical DMI consists of two reflective surfaces, one attached to the tracked object on a stage (the object beam), the other stationary (the reference beam) to provide a reference against which distance is measured. The most common arrangement uses a Twyman-Green configuration, illustrated in FIG. 3, in a setup where retro-reflectors placed at the turn-around points of the beams provide a high-quality interference signal. A DMI measurement module 20 sends out a collimated laser beam B that is divided by a beam splitter 22 into a reference beam BR and an object beam BO. The reference beam is reflected by a stationary retroreflector 24 back toward the instrument. The object beam is similarly reflected by a retroreflector 26 attached to the moving stage 28 containing the measured object. The reflected beams BRR and BOR are then recombined by the beam splitter 22 and the resulting interference beam IB is detected by a detector (not shown) and processed in the measurement module 20 to convert the interference pattern into distance readings in conventional manner.

Two methods, homodyne and heterodyne detection, are normally utilized to detect the position in space of the contact point on the object. Homodyne detection measures the interference signal directly as its intensity modulates. Heterodyne detection introduces an optical frequency shift between the BO and BR beams such that continuous high-quality phase detection can be accomplished using heterodyne methods. The disadvantage of either setup is that the distance can only be measured along a single line of sight, which allows the introduction of Abbe error as a result of the spatial gap between the line of sight of probe translation and the line of motion of the probe's contact point. In contrast to a typical DMI, the present invention is an interferometric method, and related apparatus, that allows tracking of the measured object by tracking a location at or very near the point of contact of the probe's tip with the object (rather than tracking the measurement probe), not along a single line of sight but within a cone of light generated by the measurement device, thereby producing 3-D measurements with a significant reduction of the Abbe and related errors.

Figure 4:
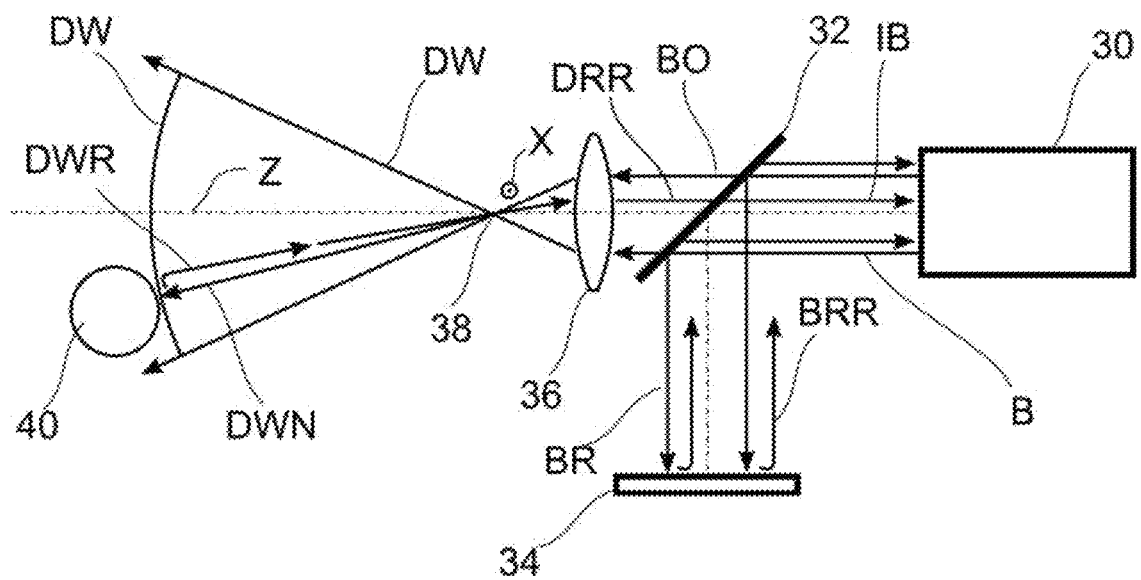
FIG. 4 is a schematic drawing of an interferometric setup for tracking objects in space according to the invention.
Figure 5:
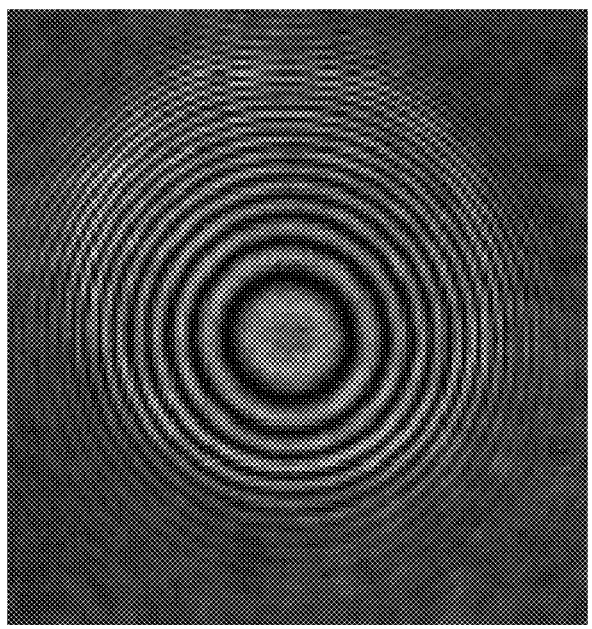
FIG. 5 illustrates an example of a "bullseye" interference pattern between a flat wavefront and a spherical wavefront.

The basic configuration of the invention is shown in FIG. 4. An interferometric measurement module 30 emits a beam of light B that is divided by a beam splitter 32 into a reference beam BR and an object beam BO. The reference beam BR is reflected by a reference mirror 34 (or a retroreflector) back toward the beam splitter and the measurement module 30 (beam BRR). The object beam BO is shaped into a diverging cone of light DW by an optical system 36, which produces a virtual source point 38. A reflective object 40, such as a sphere made of reflective material like silicon carbide, is placed in the illuminated space so that a part DWN of the light DW that is normal to the object 40 is reflected back as a beam DWR that is collected by the optical system. The returning beam toward the module 30 is shown as ray DRR which in general is not located on the optical axis Z of the illumination system in the module. The light ray DRR is then brought to interfere with the reference beam BRR and will produce a beam IB with an interference pattern substantially as shown in FIG. 5. Such interference pattern between a flat wave (BRR) and a spherical wave (DRR) is typically referred to as a "bullseye" pattern.

It is known that changes in bullseye patterns resulting from changing the optical path difference (OPD) between BRR and DRR (such as produced by moving either reflective surface 34 or 40) can be analyzed in conventional manner to measure a corresponding change in position. Therefore, this interference pattern can be used to track the position of the reflective object 40 along the axis connecting the normal to the reflective surface of the object 40 at the reflection point and the virtual focus 38 of the spherical illumination beam. Any movement of the object 40 along this line will show as a change of phase of the interference pattern and, as in DMI systems, carry information about the distance of the object from the reference surface. Such an interference pattern can be processed using any suitable method used in interferometry and the fringe phase can be used to monitor this distance. In a typical embodiment of the invention, the reference beam BR is a plane wave that can be generated by any conventional means, but it could be any other wavefront that may be suitable for making detection and processing easier.

In conventional DMI devices the phase of the interference pattern is constant across the interference wavefront so it can be analyzed by a single detector using all collected light. In contrast, in the device of the present invention only a small portion of the object beam is captured and it interferes with the reference beam only in a limited space. Thus, to explain the detection principle of the invention it is helpful to treat the two interfering beams as a two-dimensional 'image' where the fringes resulting from interference of a plane reference wave (the reference) and the spherical wave (the object beam) collected by the interferometer will be only visible locally. This representation is similar to what an imaging interferometer would 'see' when a spherical object is inserted into its field of view and any detection scheme must only select this region for analysis. However, in the optical sense the device of the invention is not an imaging system and does not require that an image of the object be formed onto the detector. All that is required is to form an interference pattern between the object and the reference beams. Therefore, the following description should be understood to represent only a means for explaining spatially localized interference and the need to isolate regions of interference for processing purposes.

As mentioned above, the interference pattern produced by the setup of FIG. 4 is a bullseye, as shown in FIG. 5. The center of the bullseye corresponds to the location where the ray DWN normal to the illuminated object 40 strikes the object. At that point the object wave DW is locally flat resulting in a nulled interference pattern, but moving further away from this point higher density fringes are seen in the interferogram. So, the processing method needs to take into account spatial fringe phase variability within the interference pattern.

Figure 6:
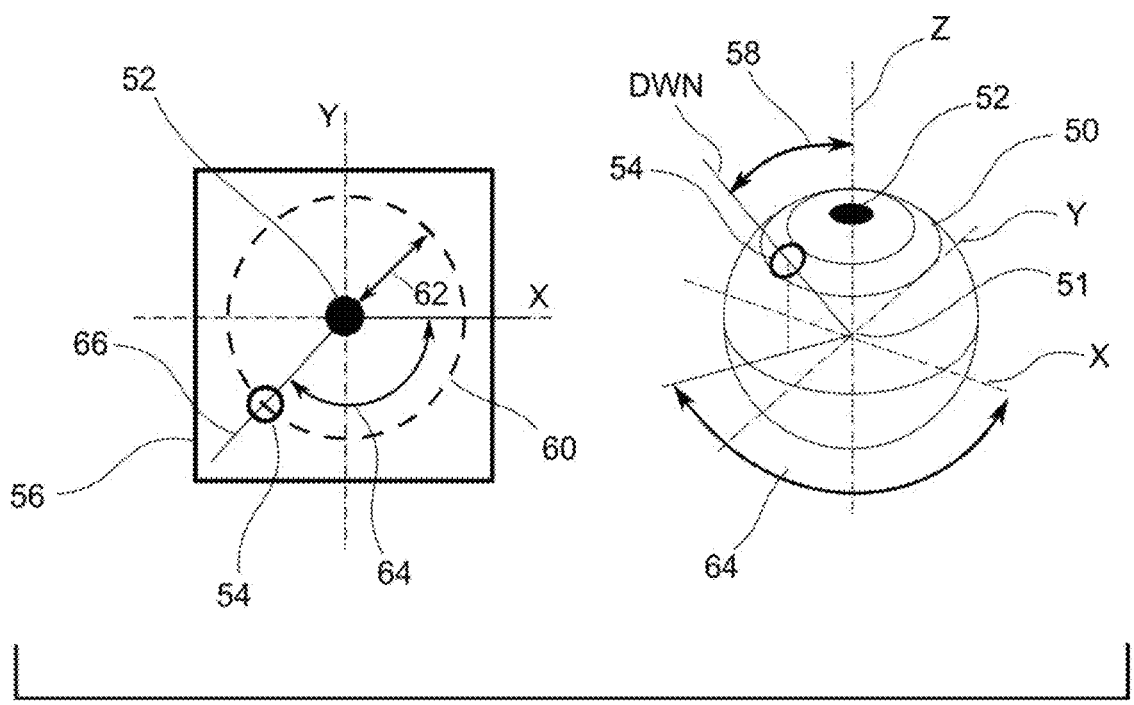
FIG. 6 illustrates the geometry of interference location in Cartesian and spherical coordinates.

It is clear that the location of the bullseye in the detection plane is not constant and will instead track the object's movements in the illuminated space. The correspondence between the location of the interference pattern in the plane of detection and the location of the reflection off the tracked object is explained in FIG. 6, where the sphere 50 (right side) represents polar coordinates of the illumination system with the origin at the virtual source point 38. In such a polar coordinate system, the illumination wavefront will appear as emanating from the origin (i.e., the center 51 of the sphere 50, corresponding to the virtual source point 38 of FIG. 4) and the optical axis Z is pointing toward the zenith at location 52. In this setup the ray DWN of FIG. 4 is shown on the surface of sphere 50 as intersecting location 54. The adjacent rectangular coordinate system 56 (left side in the figure) represents the interference detection plane in the measurement module 30 (i.e., the plane of the detector) and shows the location of the bullseye pattern, marked as spot 54 in both coordinate systems, corresponding to the location of the normal ray DWN. The angular deflection 58 of the spot 54 in the spherical coordinates (i. e., its latitude) corresponds to a ring 60 with given radius 62 in the interference plane within the rectangular coordinate system 56. Similarly, the angular location 64 of the spot 54 in the spherical coordinate system (i.e., its longitude) corresponds to line 66 in the detection plane. The intersection of these two lines (60 and 66) establishes the coordinates of the interference pattern 54 in the detection plane. Another way to think about this is in terms of a gnomonic map projection. That is, a unique correspondence between cartesian and spherical coordinates that allows back calculation of the viewing direction from the information collected with a plane detector.

This relationship is unique so it is possible to calculate the spherical coordinates of the DWN ray based on the location of the interference pattern, which therefore provides information about the location of the tracked object and can be used in the measurement process. As the object moves in the illuminated volume, the location of the bullseye follows in the interference detection plane and can be measured to provide information about the exact position of the reflective surface 40.

The phase of the interferogram at the bullseye center gives a direct indication of the distance of the object from the interferometer and can be used to track the position of the object in the same way as in conventional DMIs. However, the same approach of DMI analysis (i.e., using all collected light simultaneously to detect the interference of the reference and object beams) will yield no usable signals because of the narrow size of the ray DWN, so the detection of phase must be done locally. To that end, a photodetector is inserted at the location where the bullseye center is produced in the illumination module 30 and this detector's lateral dimensions are chosen to provide good amplitude of signal (typically they should be smaller than 0.5 times the diameter of the circle corresponding to the phase of 1 fringe period). As is well understood in the art, the larger the detector is relative to the size of the bullseye, the lower the amplitude of the usable signal is because of the periodic nature of the interference fringes.

As described previously, the location of the interference pattern in the detection plane changes as the object is moved in the field of illumination, so a suitable mechanism must be provided either to follow the bullseye pattern in the field of view in response to the object's movement, or to shift the interference pattern such that it always illuminates the detector centrally. Either of these approaches is acceptable. Being preferred as a method of operation, a system for shifting the bullseye to ensure its center is always on axis is described below, but the same principles of operation are applicable to all approaches.

Figure 7:
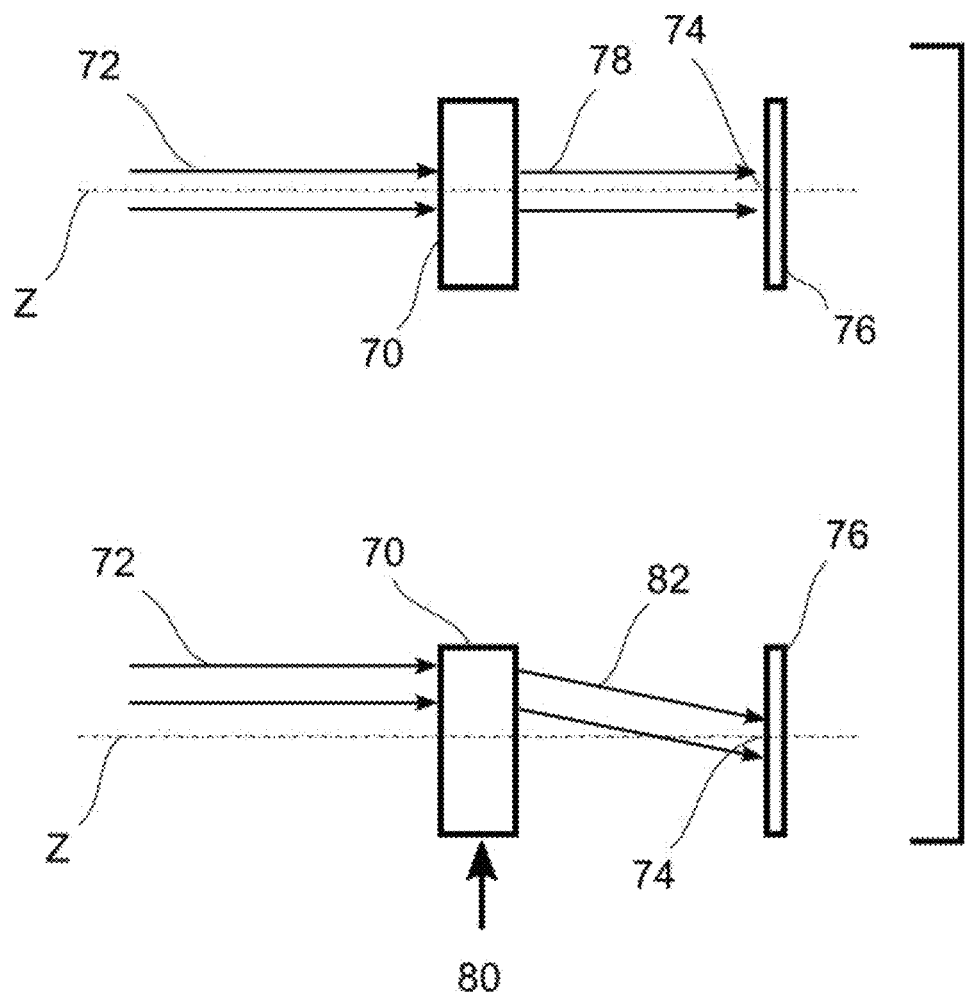
FIG. 7 is a schematic of a bullseye compensation system.

An example of a system for correcting the lateral, off-axis, bullseye position in the detector plane is shown in FIG. 7. A light shifting optical module 70 is inserted in the path of the interfering beam 72 (corresponding to the combined beams DRR and BRR in FIG. 4, for example) in order to enable the lateral shift of the interference pattern such that the bullseye position can be maintained in the center 74 of the detection field along the optical axis Z of the illumination system in the detection plane 76 even when the measured object is moved within the field of illumination. Referring to the top schematic, the interfering beam 72 is illustrated as located in the center of the detection field 74. The beam passes through the correction optical module 70 without being deviated and exits as beam 78 on axis. The interference pattern is thus centered on the center 74 of the detection plane 76. In the bottom schematic the interfering beam 72 is shown as propagating off axis, which, without correction, would result in the bullseye being located away from the center 74. However, a proper correction signal 80 is applied to produce a corrected beam 82 directed toward the center 74 of the detection plane and the interference pattern's location is thus centered on the detector.

Figure 8:
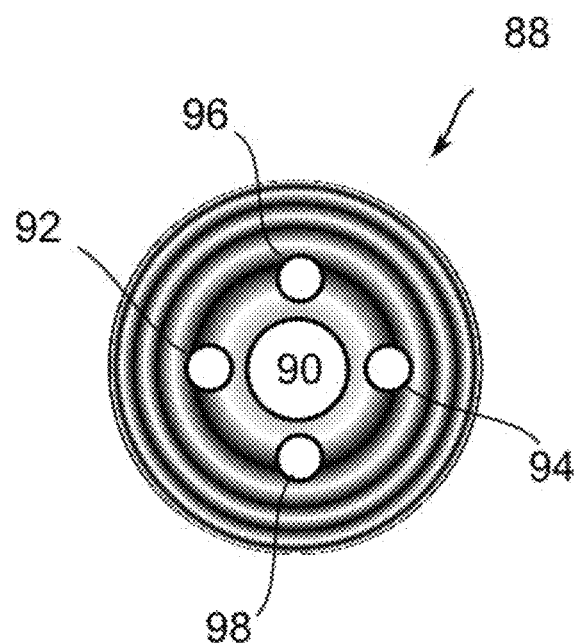
FIG. 8 illustrates a detector scheme suitable for centering the bullseye of the invention on the optical axis of the illumination system.

Such a correction module 70 can be any optical system capable of lateral shifts of the transmitted wavefront, or with the ability to tilt the wavefront. A controlled driving signal needs to be supplied in conventional manner to produce the desired correction. A possible embodiment of a system capable of producing the appropriate driving signal in feedback loop based on the interferogram signals measured by a specialized sensor is illustrated in FIG. 8. Such a sensor 88 includes a central detector 90, used to track the phase of the bullseye pattern, and a set of four satellite detectors (92,94, 96,98) used to detect the position of the pattern relative to the center of the detector. Based on the symmetric nature of bullseye interferograms, the satellite detectors can be used to provide the correction signal required to maintain the position of the bullseye pattern centered on the central detector 90 simply by shifting the beam such that the satellite detectors measure the same signals. As illustrated in the figure, they are preferably used in pairs, each pair including detectors equidistant on opposite sides of the center (i.e., detectors 92 and 96 form one pair and detectors 94 and 98 form the second pair), with each detector positioned symmetrically with respect to the center and set to either detect the phase or the intensity of the fringes. The difference of signals read by each detector in a pair is a measure of the asymmetry of the interference pattern and can be used to produce a correction signal to maintain the position of the bullseye using a correction module 70 such as illustrated in FIG. 7. As one skilled in the art would know, the size of the detectors needs to be chosen so as to provide a good quality signal; i.e., typically they need to be smaller than the size of the interference fringes. It is understood that the symmetry of the detectors' positions in the sensor 88, while preferred, is not an absolute requirement because appropriate correction signals could be obtained as well from other configurations by calibrating the system accordingly. Similarly, the sensor 88 has been described as including five detectors as separate sensing elements, but it is clear that the same result can be obtained with a single detector wherein only portions of the detector (such as five areas corresponding to detectors 90-98 in FIG. 8) are measured, as required to accomplish the correction scheme of the invention. It is also understood that an extended detector, such as a camera, can be used to track the bullseye interferogram in conventional manner.

Once the bullseye interferogram is centered as explained above, various detection schemes can be used to continuously monitor the phase of the bullseye center in order to determine the distance of the reflective surface 40 (see FIG. 4) from a reference position, thereby tracking its movements. For example, a heterodyne method can be used by introducing an optical frequency shift between the object and the reference beams. The phase of the interference pattern is directly related to the distance to the measured object and, as in DMI, it can be used to provide coordinate readings. As such, this device allows the accurate measurement of the distance of a reflective object relative to the reference surface. Uniquely, because the reflective object 44 can be measured within the cone of light DW (FIG. 4), it allows the measurement of the object within a volume of space rather than along a single line of sight, and it does so while removing or minimizing Abbe error, which provides a clear distinction and an advantage over existing technologies. Any conventional interferometric analysis programmed in a processor in the measuring module 30 can be used to produce precise information about the position of the reflective surface 40 within the frame of reference of the system.

Figure 9:
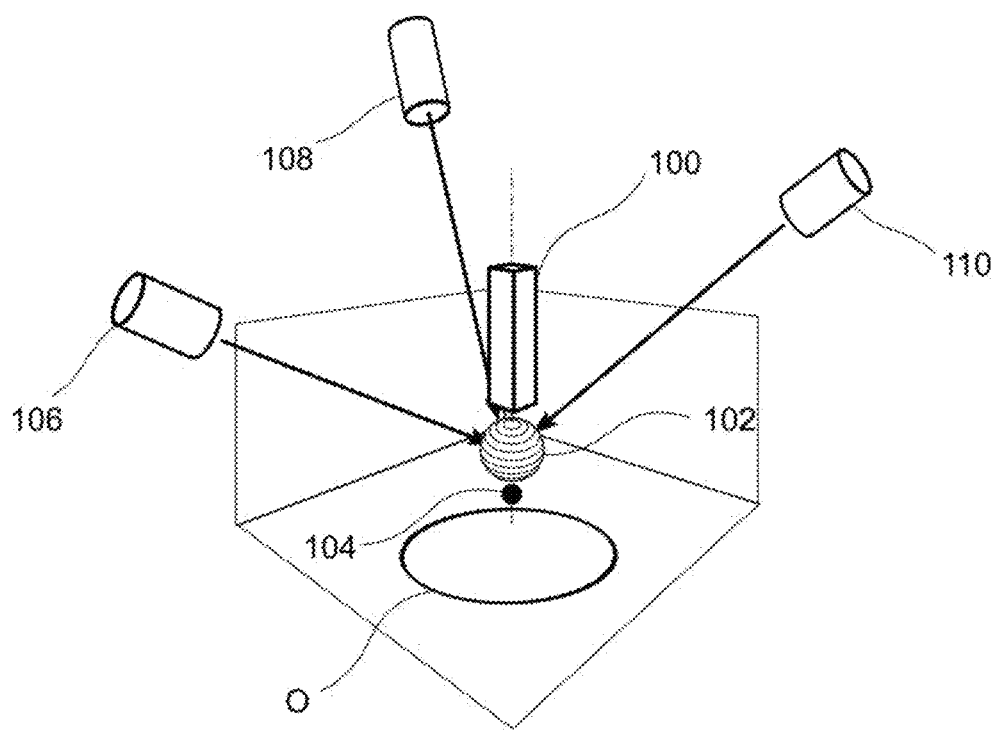
FIG. 9 illustrates a CMM using three sensors according to the invention.

Applied to a measuring machine, the detection scheme of the invention makes it possible to measure the distance from a single point in space; however, CMMs are used to measure the 3-dimensional shape of objects. Therefore, at least three tracking systems must be used simultaneously. A schematic of such a CMM is shown in FIG. 9, where a probe 100 is positioned in the measurement volume and moved around by a conventional 3-axis Cartesian metrology frame (not shown). A reflective surface 102, typically a high quality reflective sphere, is attached to the probe in proximity of the measuring tip 104. The position of the sphere is then tracked by three independent measurement modules 106, 108 and 110, each including the functional elements described above, located such that the reflective surface 102 is visible to each at all times during the measurement process. The probe is used to measure an object O in the usual way, i.e., by detecting the surface using the probe's tip; however, the coordinates of the tip are retrieved by determining the distance of the ball 102 from the three sensors 106, 108 and 110 rather than measuring XYZ coordinates of the metrology frame. While it is necessary to use three sensors to unambiguously detect the position of the probe in space, more sensors can be used to increase the system's accuracy or prevent the reflective surface from being obscured by the measured object.

The reflective surface 102 should be positioned as close as possible to the probe's point of sensing on the measuring tip 104 to minimize the Abbe error. In some cases it might be possible to use the probe's measuring tip as the reflective element as well. It is understood that the overall accuracy of the measurement is influenced by the sphericity of the reflective surface, or in general by knowledge about the shape of the reflective surface, but, as it is in the case of mechanical probe tips, such errors can be calibrated and subtracted from the measurand using an appropriate procedure.

In the description a reflective sphere was used as an example of an object the position of which can be tracked in space, but this particular shape has been chosen only to illustrate the point. It should be understood that other shapes are possible and perhaps more appropriate for this task as well. It is also anticipated that more than one reflective sphere (or other surface) may be used on the probe 100 in order to track more precisely its movements as it is being used to measure hidden areas of the test object. For example, the probe may be configured such that it can change direction to allow the tip 104 to reach cavities in the test object. If so, an additional reflective sphere with corresponding measurement modules directed to it could be attached to the other end the probe, or closer to the tip, to provide information about any deviation of the probe with respect to the translating mechanism driving it. Such combination of reflective spheres and respective measurement modules would enable tracking and measuring the tip in three dimensions anywhere within the working space of the CMM so long as the spheres where continuously in the line of sight of sufficient measurement modules (three for each sphere).

Thus, while the invention has been shown and described herein in what is believed to be the most practical and preferred embodiments, it is recognized that departures can be made therefrom within the scope of the invention. For example, any combination of reference and test beams producing a recognizable, preferably symmetric, interference pattern at the detector could be used in equivalent manner by exploiting the know properties of the pattern to detect changes in phase or intensity when the point of contact with the test object is moved. Also, it is understood that any conventional interferometric light source and related analysis tool can be used to carry out the measurements of the invention, including the spectrally-controlled-interferometry sources and related analysis tools described in the various patents issued on the subject since 2014.

Therefore, the invention is not to be limited to the disclosed details but is to be accorded the full scope of the claims, including any and all equivalents thereof.

The invention claimed is:

1. An interferometric system for measuring a position of an object in space, the system comprising:
   an interferometric measurement module configured to emit a test wavefront shaped as a diverging cone of light directed toward said object in space;
   a curved reflective surface placed within said cone of light such that a bullseye interferogram is produced and sensed by a detector;
   a processor programmed to produce a position measurement of said reflective surface based on the bullseye interferogram sensed by the detector; and
   a correction module adapted to align said bullseye interferogram with an illumination axis of the measurement module;
   wherein said reflective surface is attached to a probe in point contact with the object in space.

2. The interferometric system of claim 1, wherein said correction module includes a sensor with multiple detector elements receiving signals from the bullseye interferogram, and said processor is further programmed to drive the correction module so as to cause the detector elements to sense a bullseye pattern when said bullseye interferogram is centered on said axis of illumination.

3. The interferometric system of claim 2, wherein said multiple detector elements include four satellite detectors disposed symmetrically around a center detector.

4. The interferometric system of claim 1, wherein said reflective surface is spherical.

5. The interferometric system of claim 1, wherein said reflective surface is a tip of the probe.

6. The interferometric system of claim 5, wherein said reflective surface is spherical.

7. A coordinate measurement machine (CMM) comprising:
   at least three interferometric measurement modules configured to emit respective test wavefronts shaped as diverging cones of light;
   a curved reflective surface placed within said cones of light such that respective bullseye interferograms are produced and sensed by respective detectors;
   a processor programmed to produce a three-dimensional position measurement of said reflective surface based on the bullseye interferograms registered by the detectors; and
   correction modules adapted to align said bullseye interferograms with respective illumination axes of said measurement modules;
   wherein the reflective surface is attached to a probe of the CMM and the probe is adapted for three-dimensional motion in point contact with a measured object.

8. The CMM of claim 7, wherein said correction modules include respective sensors with multiple detector elements receiving respective signals from said bullseye interferograms, and said processor is further programmed to drive each of the correction modules so as to cause the detector elements to sense a bullseye pattern when said bullseye interferograms are centered on said respective illumination axes of the measurement modules.

9. The CMM of claim 8, wherein each of said multiple detector elements includes four satellite detectors disposed symmetrically around a center detector.

10. The CMM of claim 7, wherein said reflective surface is spherical.

11. The CMM of claim 7, wherein said reflective surface is a tip of said probe.

12. An interferometric method for measuring a position of an object in space, the method comprising the following steps:
    producing a test wavefront shaped as a diverging cone of light directed toward said object in space;
    placing a curved reflective surface connected to a probe within said cone of light such that a bullseye interferogram is produced and sensed by a detector;
    contacting the object with the probe;
    aligning said bullseye interferogram with an illumination axis of a measurement module; and
    producing a position measurement of said reflective surface based on interferometric analysis of the bullseye interferogram sensed by the detector.

13. The interferometric method of claim 12, wherein said aligning step is carried out with a sensor with multiple detector elements receiving signals from the bullseye interferogram, and by changing a direction of propagation of the bullseye interferogram such that the detector elements register an interference pattern corresponding to the bullseye interferogram being centered on said illumination axis.

14. The interferometric method of claim 13, wherein said multiple detector elements include four satellite detectors disposed symmetrically around a center detector.

15. The interferometric method of claim 12, wherein said reflective surface is spherical.

16. The interferometric method of claim 12, wherein said reflective surface is the probe contacting the object.

17. The interferometric method of claim 16, wherein said reflective surface is spherical.

* * * * *